(12) United States Patent
Records et al.

(10) Patent No.: US 6,352,053 B1
(45) Date of Patent: Mar. 5, 2002

(54) APPARATUS AND METHOD FOR ANIMAL TESTING AND TRAINING

(76) Inventors: Doug Records; Charles Records, both of 22500 S. 690 Rd., Wyandotte, OK (US) 74370; Tammy Glenn, 24100 S. 599 La., Grove, OK (US) 74344; Floyd Simmons, Rte. 4, Box 1-I, Colcord, OK (US) 74338

( * ) Notice: Subject to any disclaimer, the term of this patent is extended or adjusted under 35 U.S.C. 154(b) by 0 days.

(21) Appl. No.: 09/619,089

(22) Filed: Jul. 19, 2000

(51) Int. Cl.$^7$ .......................... A01K 37/00; B68B 1/00; G08B 23/00
(52) U.S. Cl. .......................... 119/712; 54/71; 340/573.3
(58) Field of Search ................... 119/712, 720, 119/772, 814, 839, 905; 54/44.1, 71; 340/573.1, 573.3; 24/603

(56) References Cited

U.S. PATENT DOCUMENTS

| | | | |
|---|---|---|---|
| 3,733,530 A | | 5/1973 | Labart et al. .................. 318/16 |
| 4,190,968 A | * | 3/1980 | Clapp et al. ............. 340/573.3 |
| 4,199,921 A | * | 4/1980 | Watkins .......................... 54/71 |
| 5,127,213 A | * | 7/1992 | Petronio ........................ 54/71 |
| 5,534,852 A | | 7/1996 | Schuett et al. .............. 340/573 |
| 5,771,668 A | | 6/1998 | Younger ........................... 54/1 |
| 5,771,843 A | * | 6/1998 | Karlin ......................... 119/772 |
| 5,815,895 A | | 10/1998 | Carlson et al. ............... 24/603 |
| 5,949,339 A | | 9/1999 | Ettinger et al. .......... 340/573.1 |
| 6,170,439 B1 | * | 1/2001 | Duncan et al. ............. 119/720 |

* cited by examiner

Primary Examiner—Charles T. Jordan
Assistant Examiner—Elizabeth Shaw
(74) Attorney, Agent, or Firm—Head, Johnson & Kachigian

(57) ABSTRACT

The present invention uses a pack saddle designed to simulate the weight and feel of an actual rider for testing the animal's propensity to buck. While the animal's movement is restricted, the simulated rider pack saddle is placed over the back of the animal and cinched in place with a strap that is remotely releasable. After attaching the apparatus, the animal is released and observed to determine its natural propensity to buck. After a sufficient observation period, the cinch strap is remotely released, allowing the simulated rider pack saddle to fall or be thrown off the animal. The simulated rider pack saddle can also be released as a reward after the animal performs a particularly desired bucking action. In another exemplary embodiment, the simulated rider pack saddle is further equipped with a remotely activated stimulus, such as but not limited to an electric shock device, which can train the animal to perform bucking actions or increase the animal's propensity to buck. In another exemplary embodiment, the invention includes a backup timer that automatically releases the test saddle after a predetermined test period expires. The device includes a depressible activator that initiates the timer. The timer activates a release mechanism on the saddle latch upon the expiration of the predetermined time period.

20 Claims, 4 Drawing Sheets

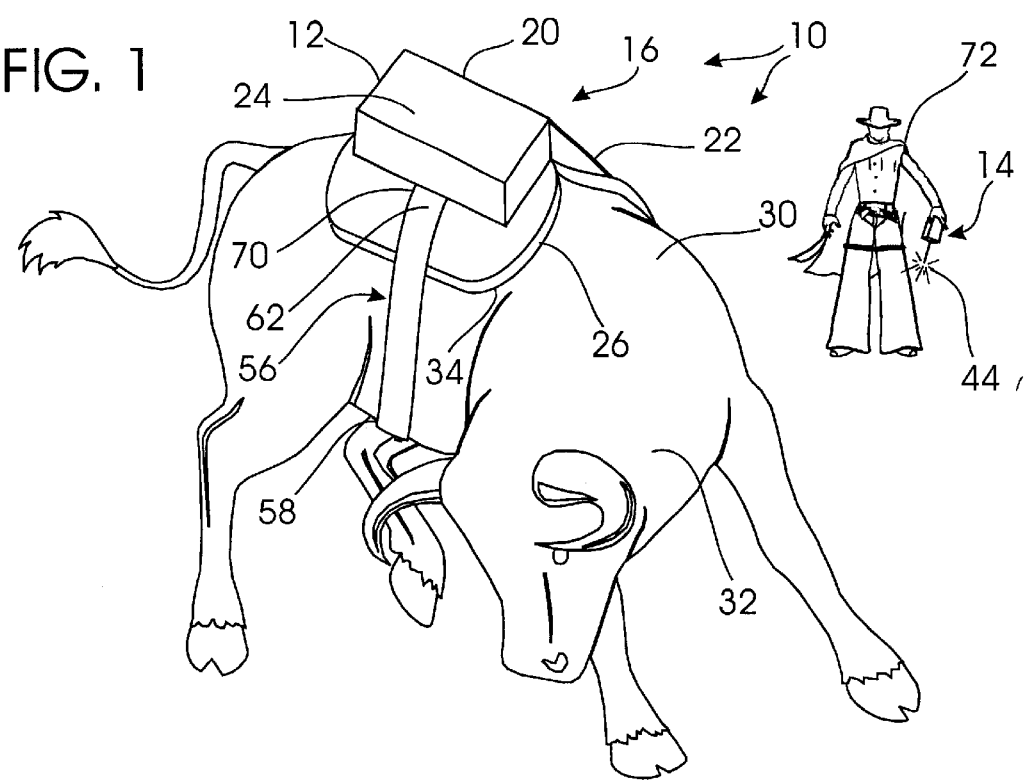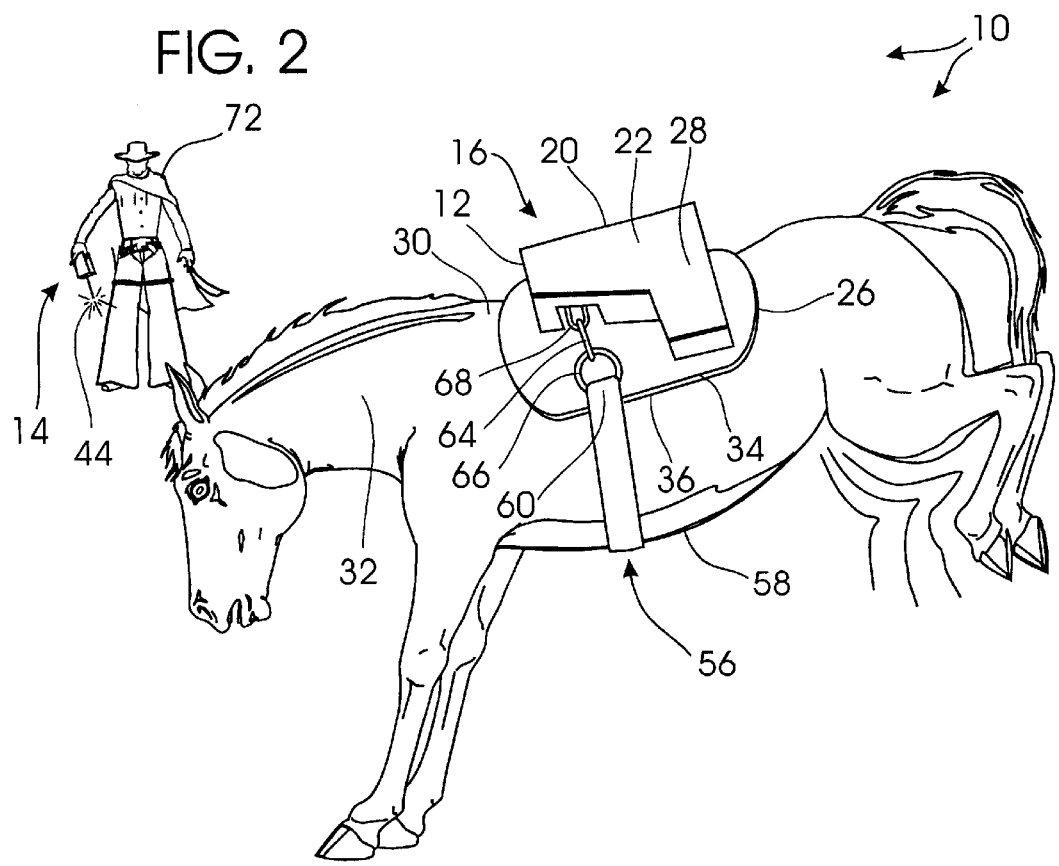

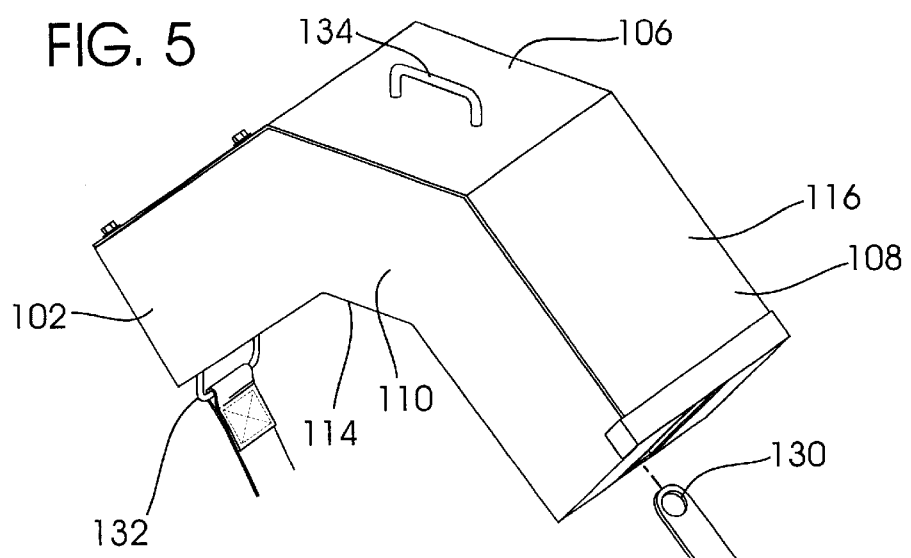
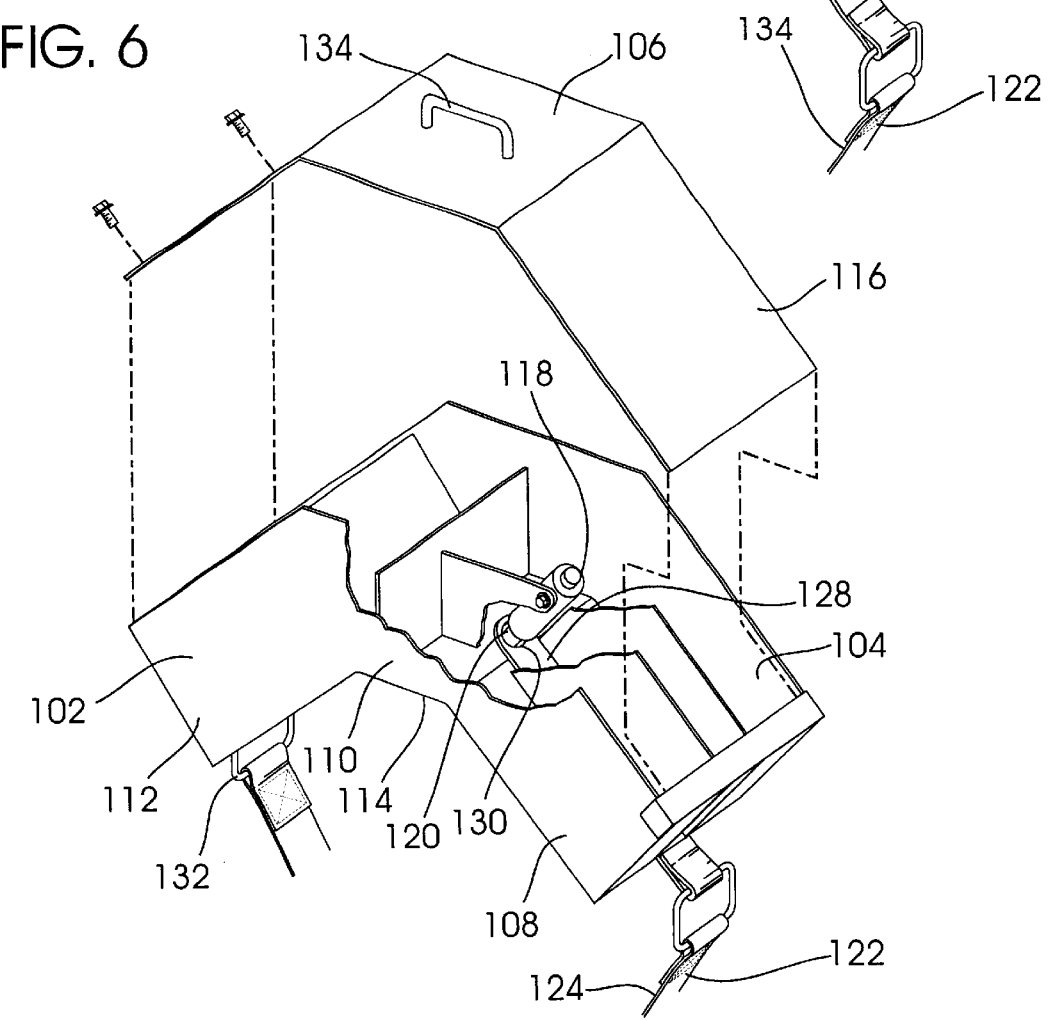

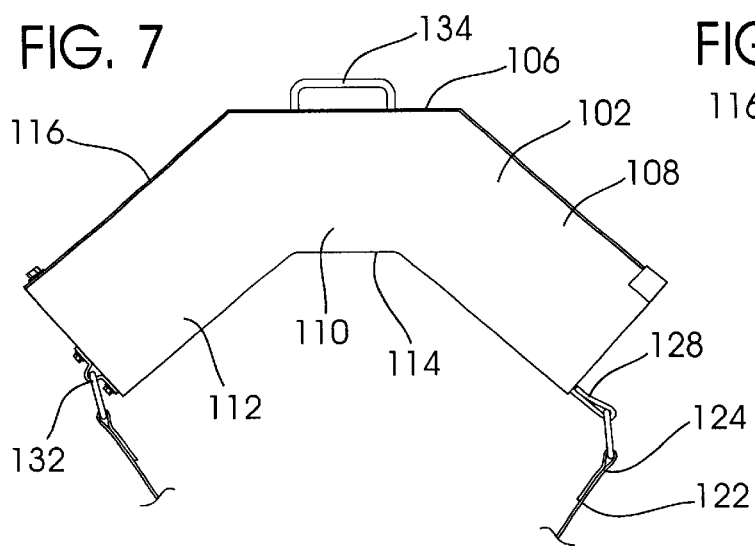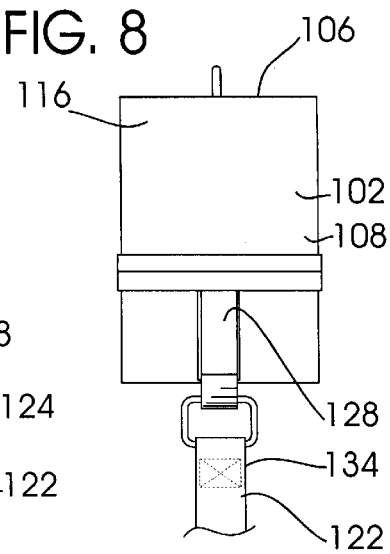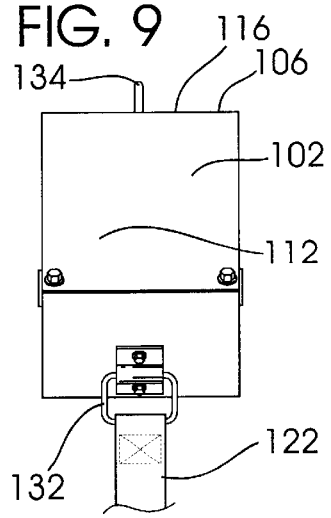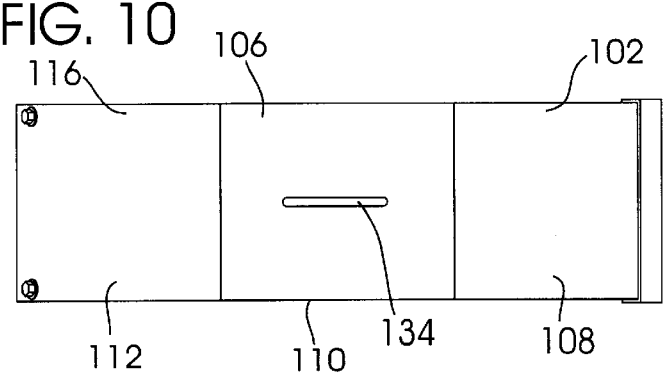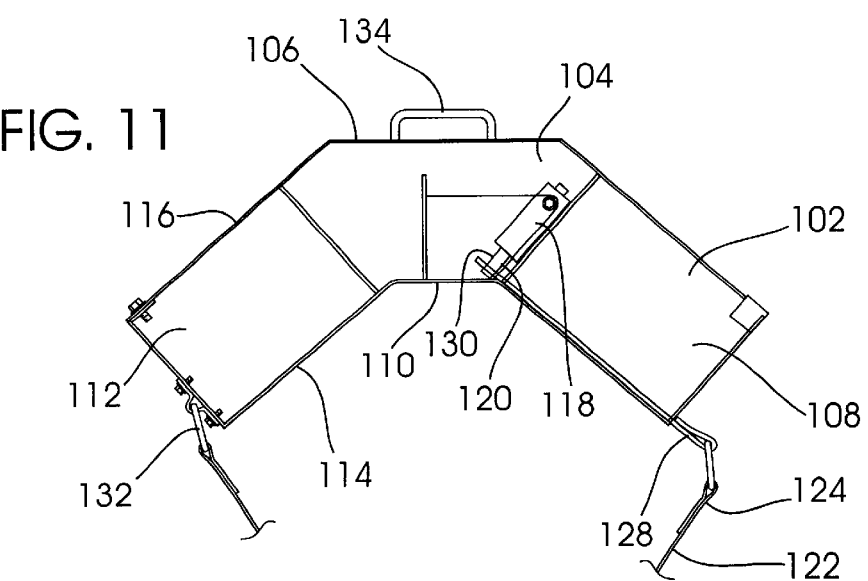

APPARATUS AND METHOD FOR ANIMAL TESTING AND TRAINING

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to an apparatus and method for animal testing and training. In particular, the present invention is directed to a simulated rider pack saddle with a remote control release and stimulus for testing and training such animals as bulls and broncos. Known art may be found in U.S. Class 318, subclass 16 and various classes and subclasses.

As will be appreciated by those skilled in the art, rodeos are popular forms of family entertainment. In the rodeo sport bull riding or bronco riding, a rider is required to mount an animal and stay mounted for a period of time. After the rider completes the time, the rider is judged and points are awarded based upon the degree of difficulty of the ride. The difficulty level of the ride is subjectively based upon the effort the animal exerts in its attempt to throw the rider and the skill demonstrated by the rider in overcoming the animal's "fight". In typical rodeo bull riding events, particularly those sanctioned by Nationals organizations such as the Professional Bull Riders (PBR) and the PRCA, the rider can score between 1–50 points per ride while the animal can score between 1–50 points for its performance during the ride.

Bulls and broncos are thus selected for their propensity to buck in the attempt to dislodge the riders for these rodeo events. Since all bulls and horses do not have the same degree of "natural" bucking propensity, a selection process must be utilized to determine which animals are more suited for these rodeo events. It is particularly important to assess this propensity at an early age of the animal because feed and upkeep for such animals are expensive.

In the known art, the popular method to determine the natural bucking propensity of animals such as bulls and broncos was to use a test rider. That is, an individual would ride the animal in question so that a judgment concerning the animal's propensity to buck could be made. Considering the number of animals that are tested to find the select few used in rodeo events, this method obviously puts the test rider in substantial, unnecessary, and repeated danger. Other disadvantages include the need for waiting until the animals mature sufficiently to bear the rider's weight.

The known art includes a bucking or flank strap is often used to increase the bucking of a bull or bronco. These straps fit generally around the loin of the animal just forward of the rear legs. The use of remote control devices to release such bucking or flank straps is also well known. Labart, et al., U.S. Pat. No. 3,733,530, discloses a bucking strap equipped with a radio-controlled latch device, which enables a rodeo official in the judging stand to release the bucking strap.

It is also to be noted that it is known to use remote control devices to release the riggings, such as cinches or bull ropes, used by bull riders to stay atop the animal. Schuett. et al., U.S. Pat. No. 5,534,852, Younger, U.S. Pat. No. 5,771,668, and Ettinger et al., U.S. Pat. No. 5,949,339 disclose devices and methods for remote controlled safety release mechanisms for cinches, which are generally placed around the animal's chest and back near the front legs and are used as hand holds by the rider trying to stay atop a bucking bull or horse, to reduce the possibility of the rider getting tangled or stuck in the cinch.

Further, it is known to use remote control devices to release saddles on broncos to free trapped riders such as disclosed by Carlson et al., U.S. Pat. No. 5,815,895.

None of the known art, however, addresses the need of an apparatus or method for testing the natural propensity of bulls and broncos to buck or throw off a rider without the need of an actual rider climbing on top of the animal. Furthermore, none of the known art provides a training device to reward or stimulate the animals when they exhibit a sufficient propensity to buck. Thus a need exists in the art.

BRIEF SUMMARY OF THE INVENTION

In view of the foregoing disadvantages inherent in the known types of apparatus and methods now present in the art, the present invention provides a new and improved construction wherein the same can be utilized reliably in those situations where animal testing and training is desired. As such, the general purpose of the present invention, which will be described subsequently in greater detail, is to provide a new and improved apparatus and method for training and testing animals which has all the advantages of the known prior art and none of the disadvantages.

To attain this, an exemplary embodiment of the present invention uses a pack saddle designed to simulate the weight and feel of an actual rider. While the animal's movement is restricted, the simulated rider pack saddle is placed over the back of the animal and cinched in place with a strap that is remotely releasable. After attaching the apparatus, the animal is released and observed to determine its natural propensity to buck. After a sufficient observation period, the cinch strap is remotely released, allowing the simulated rider pack saddle to fall or be thrown off the animal. The simulated rider pack saddle can also be released as a reward after the animal performs a particularly desired bucking action. It is also contemplated that the simulated rider pack saddle is further equipped with a remotely activated stimulus, such as but not limited to an electric shock device, which can train the animal to perform bucking actions or increase the animal's propensity to buck.

In another exemplary embodiment, the invention includes a backup timer that automatically releases the test saddle after a predetermined test period expires. While such a device could be set for almost any period, twelve seconds is believed most appropriate. The device includes a depressible activator that initiates the timer. The timer activates a release mechanism on the saddle latch upon the expiration of the predetermined time period.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other devices, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus and method for training and testing animals which eliminates the need for an actual rider.

It is a further object of the present invention to provide a new and improved apparatus and method for training and testing animals which is of a durable and reliable construction.

An even further object of the present invention is to provide a new and improved apparatus and method for training and testing animals that is susceptible to low prices of sale to the consuming industry, thereby making such apparatus and method economically available to those in need.

Still another object of the present invention is to provide a new and improved apparatus and method for training and testing animals that provides some of the advantages of the prior art, while simultaneously overcoming some of the disadvantages normally associated therewith.

It is a further object of the present invention to provide an apparatus and method for training and testing animals that allows for ease of installation on the animal to be tested and removal therefrom with no special training or tools required.

An even further object of the present invention is to allow use of apparatus and method for training and testing animals without injuring the animal.

An even further object is to permit testing of young and/or immature animals.

Still another object of the present invention is to provide a new and improved apparatus and method for training and testing animals which decreases the known hazards to those who handle such animals.

Another object is to provide a fail-safe testing device for bucking, animals.

Another object of the present invention is to provide a new and improved apparatus and method for training and testing animals that provides a training method which rewards the animal by releasing the simulated rider pack saddle after performing the desired bucking action.

A further object of the present invention is to provide a new and improved apparatus and method for training and testing animals which provides a stimulus, such as an electrical shock, to encourage the animals to perform desired bucking action.

These together with other objects of the invention, along with the various features of novelty that characterize the invention, are pointed out with particularity in the claims annexed to and forming a part of the disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWING

FIG. 1 is a perspective view of an exemplary embodiment of an apparatus for training and testing animals constructed in accordance with the present invention and operatively secured to a bucking animal;

FIG. 2 is a side view thereof operatively secured to an animal;

FIG. 5 is a perspective view of an exemplary embodiment;

FIG. 6 is a partial exploded cross-sectional view of an exemplary embodiment;

FIG. 7 is front view of an exemplary embodiment;

FIG. 8 is a side view of an exemplary embodiment;

FIG. 9 is a side view of an exemplary embodiment;

FIG. 10 is a top view of an exemplary embodiment; and

FIG. 11 is a partial front cross-section view of an exemplary embodiment.

DETAILED DESCRIPTION OF THE INVENTION

Figure 3:
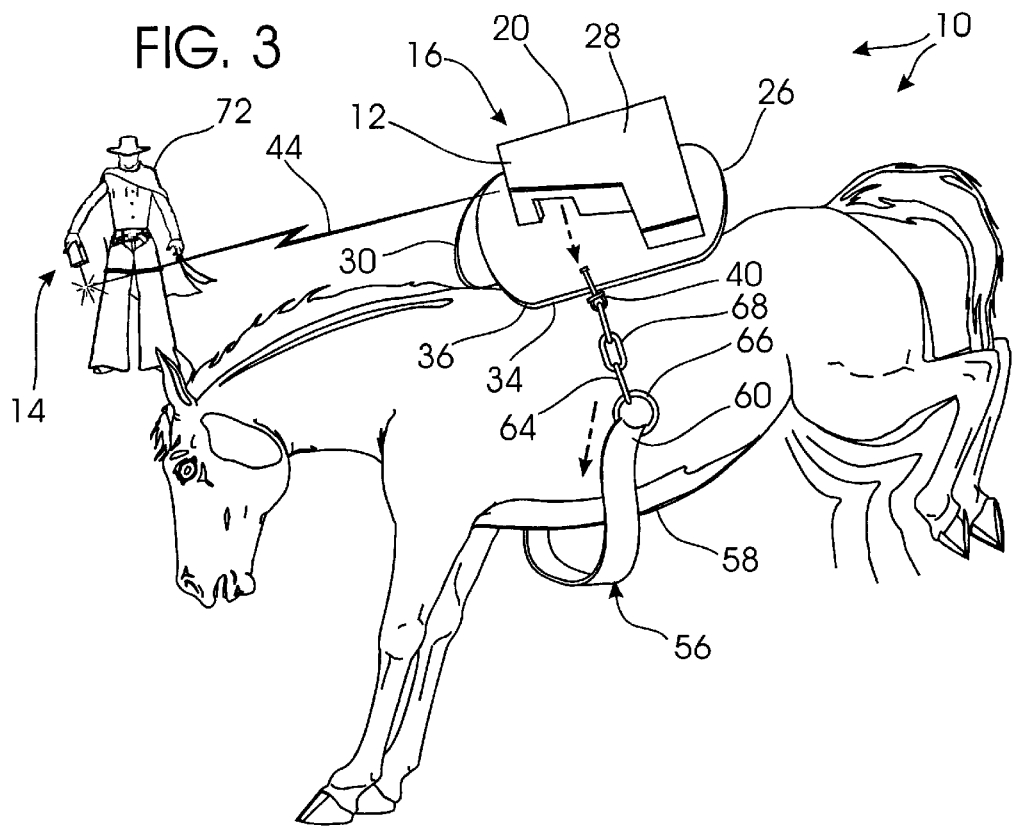
FIG. 3 is a side view thereof operatively being released.
Figure 4:
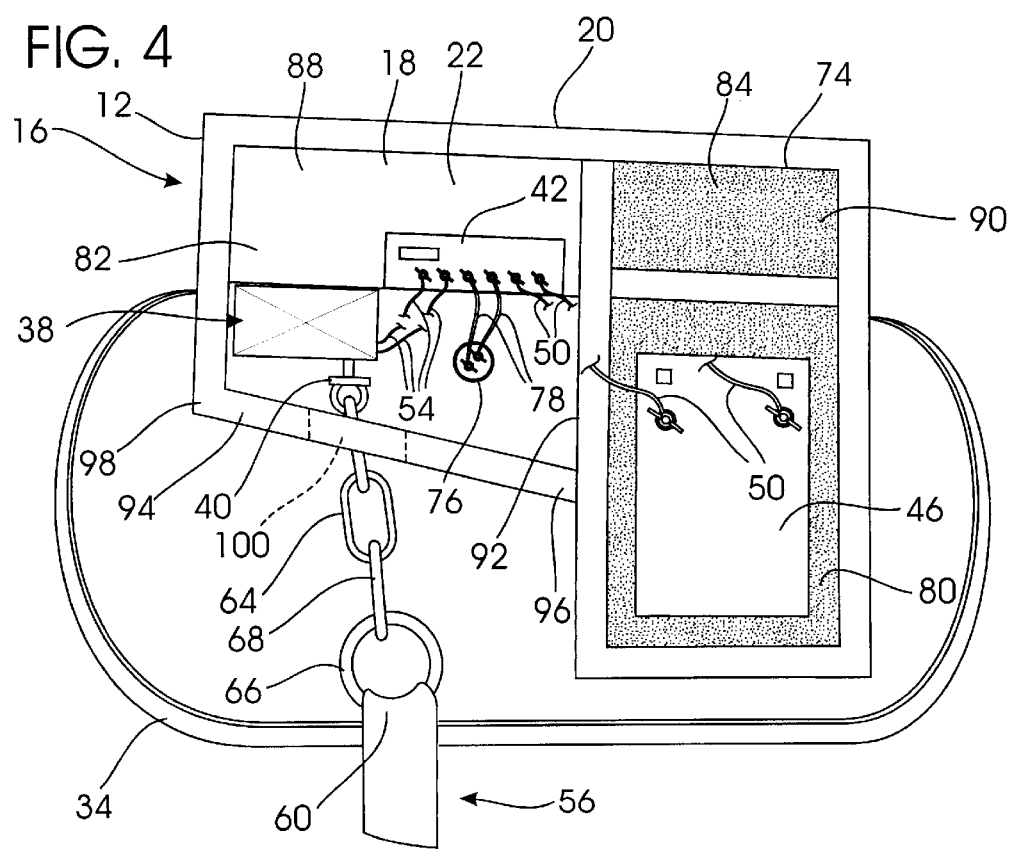
FIG. 4 is a partial side cross-sectional of an exemplary embodiment.

In accordance with an exemplary embodiment of the present invention as shown in the drawings and specifically FIGS. 1–4, reference numeral 10 generally designates a new and improved apparatus and method for testing and training animals in accordance with the present invention. The apparatus generally includes a simulated rider test device or pack saddle 12 and a remote control 14.

The pack saddle 12 generally comprises a main housing 16 with an interior compartment 18. A preferred construction of the main housing 16 is a top 20, first side 22 and second side 24, a cushioned bottom 26, and an access cover 28. The housing is preferably constructed from rugged material such as metal, wood, durable plastic or the like.

The bottom 28 is generally shaped to conform to the back 30 of animal 32 with first portion 22 on one side of the animals spine and second portion 24 on the other side of the animals spine. Housing 16 and its components, to be discussed in more detail below, are preferably evenly weighted between first portion 22 and second portion 24 to simulate the weight and balance of an actual rider sitting straddled atop animal 32. It is also contemplated that a preferred embodiment allows for the adjustment of weight by adding or subtracting removable pieces of heavy objects, such as but not limited to lead, to housing 16. Another preferred embodiment places additional weights in the interior compartment 18.

Bottom portion 28, which is in contact with the back 30 of animal 32, is preferably padded or cushioned to avoid injury to the animal 32 and provide a better fit for securing the pack saddle 12 to the animal 32. A preferred embodiment attaches durable padding 34 such as but not limited to carpet to bottom portion 28. It is also contemplated that a blanket 36 could also be used between the animal and bottom portion to further protect the animal.

Main housing 16 interior compartment 18 generally comprises a remotely releasable electrically driven latch mechanism 38, shown in block diagram, with a releasable pin 40, a transmission receiver 42 for receiving an electromagnetic signal 44, a power source 46 to operate the receiver 48 and latch mechanism 50. Power source 46 is electrically hard-wired to receiver 42 via wires 52. Receiver 38 is likewise preferably electrically hard-wired to latch mechanism 34 via wires 54.

A preferred embodiment of power source 46 is a battery for a car, motorcycle, or the like. A preferred embodiment of receiver 42 and latch 38 is but not limited to a remotely activated trunk latch system found in motor vehicles which use a keyless remote for locking and releasing doors and trunks.

Main housing 16 is removably secured to animal 32 with strap or cinch 56 that goes around chest 58 of animal 32. Strap 56 generally comprises a first end 60, a second end 62, and an adjustment buckle (not shown) for adapting the strap 56 to fit the animal 32. Strap 56 first end 60 is securely attached to release pin 40. Strap 56 is preferably constructed from leather, nylon, or other appropriate tack. In a preferred embodiment, strap 56 is attached to release pin 40 by assembly 64. Assembly 64 generally comprises metal ring 66 and adjustable chain links 68. Strap 56 second end 58 is preferably attached to second side portion 24 by assembly 70 with a preferred embodiment of tying, buckling, chaining or the like.

Another preferred embodiment allows operator 72 to selectively and remotely activate the simulated rider pack saddle 12 to deliver a jolt or electrical shock to animal 32 with bucking stimulation device 74. Stimulation device 74 generally comprises a electrical contact 76 or electrode placed in contact with animal 32 and activated by remotely control 14. Contact 76 is generally located on bottom portion 28 of main housing 12 and is connected to receiver 42 by wires 78. In one preferred embodiment, receiver 42 gets an electromagnetic signal 44 from remote control 14 which sends an electric stimulus or shock powered by power source 46 via wires 78 to contact 76 which delivers the stimulus or shock to animal 32.

Yet another preferred embodiment, housing 16 first portion 22 generally comprises a first interior section 80, a second interior section 82, and a third interior section 84. A preferred construction generally places power source 46 in first interior section 80 and adds shock absorbing material 86 such as foam, rubber, or the like to cushion the power source 46. Receiver 42 and latch mechanism 38 are preferably located in third interior section 84 add surrounded by shock absorbing material 88. First interior section 80 is generally separated by support member 90 from second interior section 82. First interior section 80 and third interior section 84 are separated from second interior section 82 by support member 92. Housing 16 further includes latch guide member 94 with a first end 96, an aperture 98, and a second end 100. Aperture 98 allows release pin 40 to be threaded into latch mechanism 38 inside housing 16.

Referring to the drawings and FIGS. 5–11. another exemplary embodiment of simulated rider pack saddle 12 generally comprises a main housing 102 with an interior compartment 104. A preferred construction of the main housing 102 is a top 106, first side portion 108, a middle portion 110, second side portion 112, a bottom portion 114, and an access cover 116. The housing is preferably constructed from rugged material such as metal, wood, durable plastic or the like.

Bottom portion 114 is generally shaped to conform to the back 30 oft animal 32 with first side portion 108 generally on one side of the animals spine, middle portion 110 generally centered over the animal's spine, and second portion 112 on the other side of the animals spine. Housing 114 is preferably evenly weighted to simulate the weight and balance of an actual rider sitting straddled atop animal 32. Bottom portion 114, which is in contact with the back 30 of animal 32, is preferably padded or cushioned to avoid injury to the animal 32 and provide a better fit for securing the pack saddle 12 to the animal 32. It is also contemplated that durable padding (not shown) may generally cover the entire housing 102 to further protect the animal from being injured as pack saddle 12 falls off the animal.

Main housing 102 interior compartment 104 generally comprises a remotely releasable electrically driven latch mechanism 118 with latch 120. Main housing 102 is removably secured to animal 32 with strap or cinch 122. The straps going around the animal resemble automotive seat belts with two latches to pull tight against the animal to secure the saddle 12 thereto. Strap 122 generally comprises a first end 124, a second end 126, and an adjustment buckle (not shown) for adjusting the length of strap 122. Strap 122 first end 124 is securely attached to catch bar 128 which generally comprises a flat piece of metal with aperture 130 for removably attaching to latch mechanism 118. Strap 122 second end 126 is preferably attached to second side portion 112 by assembly 132.

In another exemplary embodiment, main housing 102 further includes handle assembly 134 for easier attachment to animal 32 and retrieval. Handle assembly 134 is preferably located on top 106 of main housing 102, but it is also contemplated that more than one handle assembly 134 may be situated on other portions of housing 102.

In another exemplary embodiment, a fail-safe release mechanism may also be included to ensure prompt release of the saddle 12 after activation of the remote or in case the tester forgets or is otherwise distracted and the remote release is not actuated.

The fail-safe release automatically actuates the latch mechanism to release it so the saddle 12 may be bucked off after a pre-determined time period. For example, a fail-sate system would include a depressible detent that initiates the timer. Such detent would be depressed when the animal was released to coincide with the start of the test buck. Detent depression initiates an internal timer that releases the latch mechanism after a predetermined time period. While many periods of time may be chosen, twelve seconds has proven useful in experimental tests. This period isn't sufficient to frustrate the animal but it is sufficient to test the animal's natural bucking propensity. Further, since the fail-safe requires manual activation, it can be easily bypassed for training or other purposes.

Operation

In a preferred method of operation, the animal 32 to be tested or trained is temporarily restrained in a pen or chute while the simulated rider pack saddle 12 is generally placed on the back 30 of animal 32 in the same approximate location as a rider would sit. The cinch strap 56 is placed around chest 58 of animal 32 and strap 56 first end 60 with release pin 40 is joined at housing 16 latch mechanism 38 after being threaded through aperture 98. The animal 32 is then released from the temporary restraint and observed for a period of time while animal 32 attempts to remove pack saddle 12. After a sufficient period of observation, operator 72 activates remote control 14 sending an electromagnetic signal 44 to receiver 42. Receiver 42 actuates latch 32 releasing pin 40. The pack saddle 12 falls off the animal 32 and is retrieved.

The timing of the release of the simulated rider pack saddle 12 may also be used as a training method where pack saddle 12 is released as a type of reward after the animal 32 exhibits a particularly violent bucking action. This method would encourage animal 32 to perform more aggressively in the attempt to throw the pack saddle 12 or an actual rider, and thus perform better in a rodeo event.

In operation of another preferred embodiment, operator 72 selectively and remotely sends an electromagnetic signal 44 to receiver 42. Receiver 42 sends an electrical shock to animal 32 through contact 76 which can be used a stimulation to encourage the animal 32 to buck.

Thus, it will be appreciated that as a result of the present invention, a new and improved animal testing device and method is provided by which the principle objective, among others, is completely fulfilled. Changes may be made in the combinations, operations, and arrangements of the various parts and elements described herein without departing from the spirit and scope of the invention as defined by the claims.

What is claimed is:

1. An apparatus that enables an observer to test an animal to determine its propensity to buck, said apparatus comprising:
    a saddle adapted to simulate a rider when said saddle is releasably secured to the animal to thereby stimulate the animal to buck, said saddle having a releasable cinch responsive to a remote release signal; and,
    a remote control selectively actuable by the observer to transmit said remote release signal to release said cinch to thereby enable the animal to buck off said saddle.

2. The apparatus of claim 1 wherein said saddle further comprises:
    a housing defining an interior compartment bounded by a top and a cushioned bottom adapted to be placed on the animal and wherein said cinch comprises an elongated strap having a first end secured to said housing and a second end adapted to be placed about the chest of the animal and coupled opposite said first end to said housing and a latch adapted to temporarily secure said second end to said housing, said latch responsive to said remote control.

3. The apparatus of claim 2 wherein said housing includes a power source and a receiver, said receiver coupled to said power source and adapted to selectively actuate said latch in response to said remote release signal.

4. The apparatus of claim 2 wherein said interior compartment is adapted to receive weights to simulate riders of varying weights to enable testing of animals of varying maturity.

5. The apparatus of claim 3 further comprising:
    a contact penetrating said cushioned bottom to establish an electric pathway between the animal and said power source to enable the observer to selectively stimulate the animal electrically to initiate or intensify the animal's bucking activity and wherein said remote control includes means for controlling said stimulation.

6. A simulated rider pack saddle system for testing and training an animal such as a bull or bronco for determining the animal's propensity to buck, said system comprising:
    a housing adapted to be temporarily placed on the animal;
    a strap having a first end attached to said housing and a second end adapted to be disposed about the animal to temporarily secure said housing on the animal;
    a power source secured inside said housing and a signal receiver secured inside said housing and in communication with said power source;
    a release assembly attached to said housing in communication with said signal receiver and releasably attached to said strap second end; and
    a remote signal generating device in communication with said signal receiver and adapted to selectively send a remote signal to said release assembly to effectuate the release of said second end.

7. The system of claim 6 wherein said housing further includes an interior compartment adapted to receive said power source, said receiver, said actuating release assembly.

8. The system of claim 7 wherein said housing further includes a removably attached access panel in communication with said interior compartment.

9. The system of claim 8 wherein said interior compartment further includes a weighted mass to simulate a heavier rider.

10. The system of claim 6 wherein said power source is a battery.

11. The system of claim 6 further includes a handle assembly mounted on said housing.

12. The system of claim 6 wherein said housing is constructed from metal.

13. The system of claim 12 wherein said housing is covered with padding.

14. The system of claim 6 wherein said system further comprises:
    an electrical contact for sending an electrical current to the animal said contact attached to said housing and in communication with the animal, said power source, and said signal receiver;

a remote control for selectively sending a signal to said receiver which opens and closes said contact to regulate the electric current from said power source to the animal to further stimulate the animal to buck.

15. The system of claim 6 wherein said actuating release assembly Further includes a solenoid responsive to said power source.

16. A method permitting an observer to determine the bucking propensity of an animal such as a bull or horse, said method comprising the steps of:

(a) securing the animal;

(b) placing on the animal's back a simulated rider, said rider comprising:

a weighted saddle adapted to simulate a person when said saddle is releasable secured to the animal to thereby stimulate the animal to buck, said saddle having a releasable cinch responsive to a remote release signal; and, a remote control selectively actuable by the observer to transmit said remote release signal to release said cinch to thereby enable the animal to buck off said saddle;

(c) releasing said animal;

(d) observing said animal's bucking attempts to remove said simulated rider; and, (e) transmitting a remote release signal to said cinch to enable the animal to buck off said saddle.

17. The method of claim 16 wherein the step of observing said animal further includes waiting for said animal to make desired bucking action before transmitting said release signal.

18. The method of claim 16 wherein said saddle further comprises:

a housing defining an interior compartment bounded by a top and a cushioned bottom adapted to be placed on the animal and wherein said cinch comprises an elongated strap having a first end secured to said housing and a second end adapted to be placed about the chest of the animal and coupled opposite said first end to said housing and a latch adapted to temporarily secure said second end to said housing said latch responsive to said remote control.

19. The method of claim 16 wherein said saddle includes means for remotely stimulating the animal to buck and further including the step of remotely stimulating the animal to buck after said release step.

20. The method of claim 19 wherein said means comprises:

a power source and a receiver, said receiver coupled to said power source and adapted to selectively actuate said latch in response to said remote release signal;

a contact penetrating said cushioned bottom to establish an electric pathway between the animal and said power source to enable the observer to selectively stimulate the animal electrically to initiate or intensify the animal's bucking activity and wherein said remote control includes means for controlling said stimulation.

* * * * *